US008380574B2

(12) United States Patent
Naccache et al.

(10) Patent No.: US 8,380,574 B2
(45) Date of Patent: Feb. 19, 2013

(54) METHOD AND SYSTEM FOR VALIDATING A TRANSACTION, CORRESPONDING TRANSACTIONAL TERMINAL AND PROGRAM

(75) Inventors: David Naccache, Paris (FR); Eric Brier, Valence (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 0 days.

(21) Appl. No.: 13/069,035

(22) Filed: Mar. 22, 2011

(65) Prior Publication Data

US 2011/0238513 A1    Sep. 29, 2011

(30) Foreign Application Priority Data

Mar. 23, 2010   (FR) ...................................... 10 52095

(51) Int. Cl.
*G06Q 20/00* (2006.01)

(52) U.S. Cl. ................ 705/18; 705/40; 705/44; 705/67; 455/436; 713/193; 709/219

(58) Field of Classification Search ................ 705/18, 705/67, 44; 713/193; 380/258; 709/219, 709/225
See application file for complete search history.

(56) References Cited

U.S. PATENT DOCUMENTS

| 6,477,370 | B1 * | 11/2002 | Sigler et al. ............... 455/427 |
| 7,966,384 | B2 * | 6/2011 | Marr ............................... 709/219 |
| 8,016,186 | B2 * | 9/2011 | Kwak et al. .................... 235/379 |
| 2003/0120940 | A1 * | 6/2003 | Vataja ............................ 713/193 |
| 2004/0190718 | A1 | 9/2004 | Dacosta |
| 2007/0011099 | A1 * | 1/2007 | Sheehan ......................... 705/65 |
| 2007/0184817 | A1 | 8/2007 | Karaoguz |
| 2009/0031006 | A1 * | 1/2009 | Johnson ......................... 709/218 |
| 2010/0121697 | A1 * | 5/2010 | Lin et al. ..................... 705/14.14 |
| 2010/0153272 | A1 * | 6/2010 | Wentker et al. ................. 705/44 |

FOREIGN PATENT DOCUMENTS

| EP | 1696626 A1 | 8/2006 |
| WO | 2007024170 A1 | 3/2007 |

OTHER PUBLICATIONS

French Search Report dated Oct. 15, 2010, from French Application No. 1052095 filed on Mar. 23, 2010.

* cited by examiner

*Primary Examiner* — Vanel Frenel
(74) *Attorney, Agent, or Firm* — David D. Brush; Westman, Champlin & Kelly, P.A.

(57) ABSTRACT

A method and apparatus are provided for validating a transaction on a transactional terminal, the transaction being associated with a user. The method includes a step of decoding a validation code preliminarily generated and displayed by the transactional terminal, entered by the user in a validation message, and transmitted by a mobile device of the user to an entity of a telecommunications network to which the mobile device and said transactional terminal are connected.

16 Claims, 2 Drawing Sheets

METHOD AND SYSTEM FOR VALIDATING A TRANSACTION, CORRESPONDING TRANSACTIONAL TERMINAL AND PROGRAM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the validation of transactions performed by a user on a transactional terminal.

More specifically, the disclosure pertains to validation systems enabling users to perform a predetermined action, for example a payment, rapidly and in a practical manner.

BACKGROUND OF THE DISCLOSURE

A known, much used system for validating transactions is that of associating a secret and personal code with a user, which code he uses when he must for example access a place or validate transaction through an electronic payment terminal.

One drawback of this system lies in the fact that the secret code may be stolen from the user, thus enabling a fraudulent individual to usurp the user's identity and act in his place. Another drawback lies in the fact that the user must remember his code to validate a transaction.

There also exists systems for authenticating a user, including biometry, commonly used to identify and/or authenticate users on the basis of individual physical characteristics and enabling the validation of transactions to be made secure.

However, one drawback of these prior-art biometric authentication systems lies in the fact that they are slow when used to reference a large number of users (for example to control access to an underground railway system in a large urban conurbation or to authenticate a user of a bank card).

Indeed, the duration of the verification step during which the authentication decision proper is taken depends on the number of users referenced in the authentication system. The greater the number of users referenced, the greater the number of potential comparisons that must be made to determine or not determine the authentication of a user.

There is therefore a need for a technique to overcome these drawbacks of prior-art transaction validation systems.

SUMMARY

An aspect of the present disclosure relates to a method for validating a transaction on a transactional terminal, the transaction being associated with a user.

According to an exemplary embodiment, such a method comprises a step for decoding a validation code preliminarily generated and displayed by the transactional terminal, entered by the user in a validation message transmitted by a mobile device of the user to an entity of a telecommunications network to which the mobile device and the transactional terminal are connected.

Thus, an aspect of the disclosure relies on a novel and inventive approach to validating a transaction, associated with a user, on a transactional terminal using a mobile device of the user (for example his cell phone) to send a validation message comprising a validation code generated by the transactional terminal. Thus, the user takes action in the validation of the transaction by reading a code displayed by the transactional terminal and copying it into a validation message on his cell phone. The user then transmits this validation message through his cell phone to an entity of a telecommunications network to which his cell phone is connected and to which the transactional terminal is also connected.

This communications network may include firstly a mobile network to which the user's cell phone is connected and if necessary the transactional terminal when it is of a mobile type (for example equipped with a SIM card) and a wired network to which the transactional terminal is connected if it is not of a mobile type.

According to one particular characteristic of the disclosure, the method comprises steps for:
  receiving a validation code preliminarily generated and displayed by the transactional terminal, entered by the user into a validation message transmitted by a mobile device of the user to an entity of a telecommunications network to which the mobile device and the transactional terminal are connected;
  identifying a base station of a mobile telecommunications network to which the user's mobile device is connected;
  decoding the validation code delivering at least one piece of information representing an identifier of the transactional terminal;
  validating the transaction when the identified transactional terminal is in the zone of coverage of the identified base station to which the user's mobile device is connected.

Thus, in an exemplary embodiment, the method uses the possibility of locating a user's mobile device, for example a cell phone, to validate a transaction performed by a transactional terminal and associated with the user in question.

The general principle of an exemplary embodiment is based on the sending, by a mobile device of the user, of a validation code used both to locate the user through his mobile device and identify the transactional terminal on which the transaction is performed. Thus, the transaction is validated when it can be determined that the user is truly located in the vicinity of the transactional terminal in question.

This proximity is determined firstly through the location of the mobile device and secondly through a piece of information representing the transactional terminal, contained in the validation code and a piece of information for locating the transactional terminal known to the validation system.

According to a first embodiment, with the transactional terminal being mobile and connected to a base station of the mobile communications network, the validation system can identify the transactional terminal located in the vicinity of the user's mobile device.

According to a second embodiment, for example when the mobile terminal is connected to a wire communications network, a piece of information localizing the transactional terminal is transmitted to the validation system.

In particular, the validation message is of the SMS or MMS type.

Thus, the sending of the validation code by the user is swift in as much as he only has to send an SMS.

Preferably, the validation code is a short code that can be swiftly keyed in.

According to one particular aspect, the decoding step additionally delivers a piece of information representing the transaction.

Thus, the validation code, when decoded, can also identify the transaction to be validated, for example by supplying an "order number" i.e. a number relating to the order in which the transactions are performed by the transactional terminal.

Classically, the transactional terminal transmits information on the transactions performed and in progress, especially the amount associated with each transaction which itself is identified by an order number.

Thus, the amount of the transaction associated with the order number can easily be determined by the validation system and can be associated with the user performing the transaction.

According to one characteristic, for example, the identifier of the transactional terminal corresponds to the result of a function $f(x,y)$ enabling a unique identifier to be associated with a transactional terminal as a function of its localization $(x,y)$.

For example, the function can be written as follows: $f(x, y) = a \times v + u$, with:
- a and b being two integers such that $b \geq a$, and $n = a \times b$, where n represents the number of different identifiers to be allotted to the transactional terminal;
- $w = E[x/a] \mod 2$ ;
- $u = x \mod a$;
- $v = (y + w \times E[b/2]) \mod b$, with $E[.]$ being the integer part; and $$d = \text{Min}\left(b, \sqrt{a^2 + \frac{b^2}{4}}\right)$$

the minimal distance between two distinct transactional terminals.

According to one exemplary embodiment, the method also comprises a step for receiving a confidential code, preliminarily entered by the user in the transactional terminal and transmitted by the transactional terminal concomitantly with the transmission of the validation code by the user's mobile device.

Thus, the validation of the transaction is also subjected to the verification of a confidential code associated with the user and entered in the transactional terminal at the time of the transaction.

Thus, a double verification can be implemented to validate a transaction because it is necessary for the user to both enter a unique confidential code associated with him and use his cell phone to validate a transaction.

Thus, if an ill-intentioned person gets to know the user's confidential code but does not have his cell phone, the transaction cannot be validated.

Similarly, if an ill-intentioned person manages to steal the user's cell phone but does not know his confidential code, the transaction cannot be validated.

According to another aspect of the disclosure, the validation message includes a confidential code.

Thus, the validation of the transaction is also subject to the entry of a confidential code into the validation message containing the validation code, thus reinforcing the security of the transaction.

According to one alternative embodiment, the method also includes a step for selecting a telephone operator with which the user's mobile device is registered.

Thus, the implementing of one or more embodiments of the disclosure is not limited to a single telephone operator. This entry step takes place on the transactional terminal, for example after several choices have been proposed by the transactional terminal.

For example, the transactional terminal may be a mobile payment terminal connected to the telecommunications network.

In particular, the transaction terminal is connected to the base station.

According to one particular characteristic of an embodiment, the method also comprises a step for the transmission of the validation code by the entity of the telecommunications network to the transactional terminal, and the step for decoding the validation code is implemented within the transactional terminal.

The disclosure also pertains to a system for validating a transaction on a transactional terminal, the transaction being associated with a user.

According to an exemplary aspect of the disclosure, the system comprises means for decoding a validation code preliminarily generated and displayed by the transactional terminal, entered by the user into a validation message transmitted by a mobile device of the user to an entity of a telecommunications network to which the mobile device and the transactional terminal are connected.

The disclosure also pertains to a transactional terminal comprising means for generating a validation code on the basis of at least one piece of information representing an identifier of the transactional terminal and means for displaying the validation code generated on a display device of the transactional terminal.

Another aspect of the disclosure pertains to a computer program product downloadable from a communications network and/or recorded on a computer-readable carrier and/or executable by a processor, comprising program code instructions to implement the method for validating a transaction as described here above.

BRIEF DESCRIPTION OF THE DRAWINGS

Other exemplary characteristics and advantages shall appear more clearly from the following description of a particular embodiment given by way of a simple, illustrative and non-restrictive example, and from the appended drawings, of which.

DETAILED DESCRIPTION OF ILLUSTRATIVE EMBODIMENTS

Figure 1:
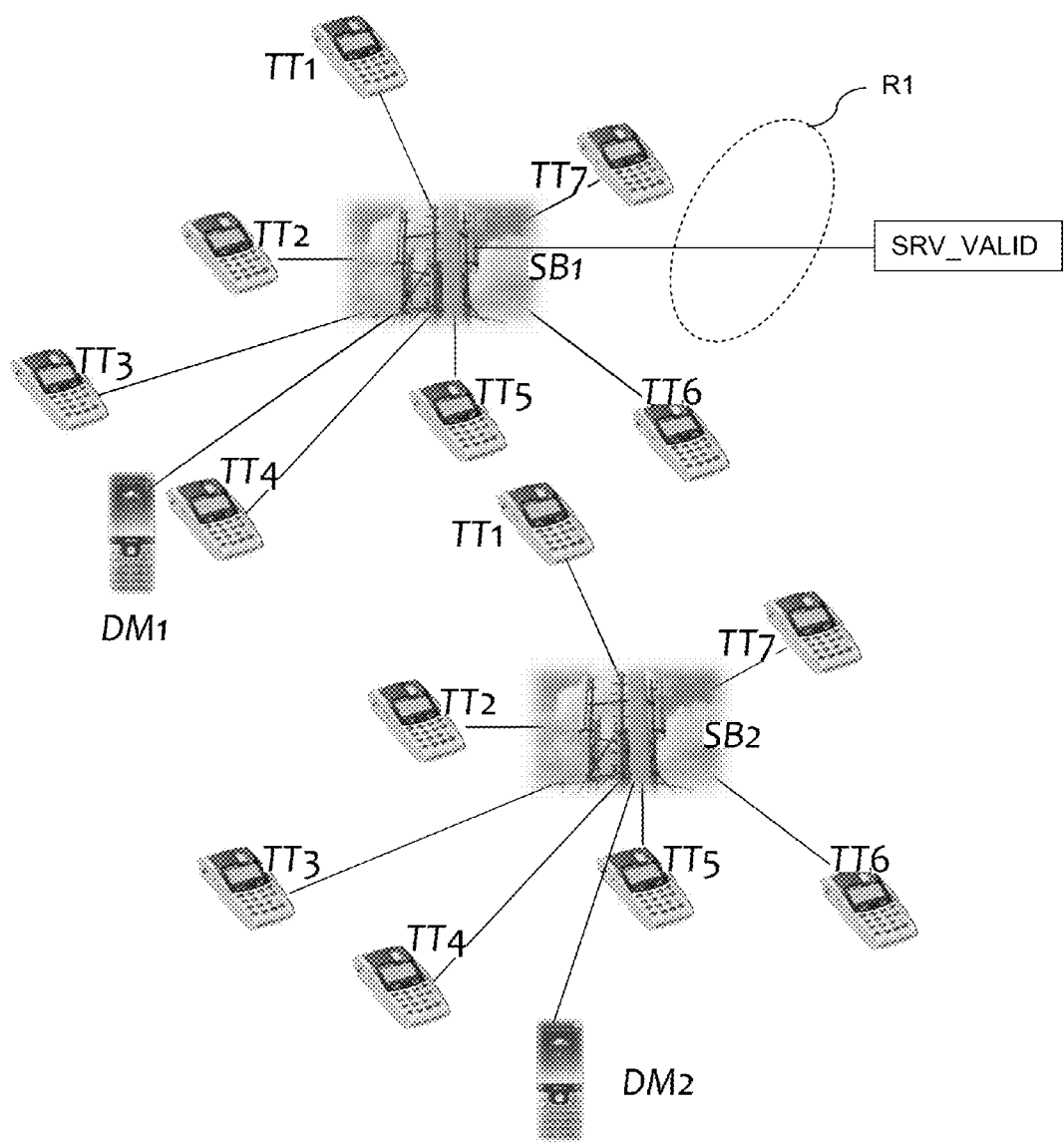
FIG. 1 presents the context for implementing the method for validating a transaction.

An exemplary embodiment of the present disclosure can be applied especially to mobile devices such as cell phones, portable GPS systems, personal digital assistants (PDAs), laptops and all other apparatuses, here below designated as mobile devices, whose purpose is to communicate through a mobile telecommunications network, and possess or be the source of a piece of information on precise and approximate location and generally be within reach of their owners.

An aspect of the disclosure also applies, in at least one embodiment, to transaction verification devices called "transactional terminals" here below, for example payment and identity verification terminals, electronic locks, cash registers and access control terminals, public transport terminals etc. These devices are designed to communicate through a telecommunications network and have a precise or approximate location known to their managers.

1. General Principle

The general principle of an exemplary embodiment of the disclosure relies on the use of a mobile device of the user (for example his cell phone) to send out a validation message generated and displayed by the transactional terminal, making it possible to both localize the user through his mobile device and identify the transactional terminal on which the transaction is performed. Thus, the transaction is validated when it can be determined that the user is truly localized in proximity to the transactional terminal in question.

This proximity is determined firstly through the localizing of the mobile device and secondly through a piece of information representing the transactional terminal, contained in the validation code, and through a piece of information, known to the validation system, for localizing the transactional terminal.

One of the main characteristics of mobile telecommunications networks is that a mobile device, whatever it may be, is permanently covered by a base station, or a base transceiver station (BTS).

When an apparatus comes out of the zone of coverage of a base station, it is transferred to another base station. This transfer is done in order to improve the quality of the signal.

In other words, the telecommunications operator has real-time knowledge of the approximate geographical position of a mobile device in the mobile telecommunications network: the mobile device is situated in the zone of coverage of the base station to which it is attached.

The method of an exemplary embodiment of the disclosure generally makes use of this localization. The method makes it possible to use a mobile device held by a user firstly as a vector to validate the transaction through a validation message comprising a validation code and secondly as a means of localizing the user.

In addition, an embodiment of the method works whatever the type of mobile device possessed by the user; the user does not need to have a latest-generation mobile device or very sophisticated device available in order to benefit from the advantages provided by the method.

Similarly, a transactional terminal also communicates through a wired or mobile telecommunications network depending on the type of transactional terminal, thus enabling precise or approximate geographical localization by the operator of the telecommunications network.

The method generally makes use of this localization of the transactional terminal to ascertain that the user, localized through his mobile device, is in the vicinity of the transactional terminal which is also localized, for example.

Such systems may be used to make payments in a simple way, without its being necessary for a user to use a bank card or have a particular mobile device available.

Such systems can also be used to control access to a building, a firm, a geographical zone, a show, an event, an installation or a means of transport in a large agglomeration and thus reference a very large number of users.

Here below, to illustrate the method according to a particular example, we shall consider a system of this kind used to validate a payment in a shopping center.

Referring to FIG. 1, we present a general technical context for implementing the method. A base station (SB1) is connected through a telecommunications network (R1) to a validation server (SRV-VALID). The base station possesses a coverage zone within which transactional terminals (TT1 to TT7) and a mobile device (DM1) are identified and connected.

The validation server (SRV-VALID) is situated for example in the telecommunications network managed by the user's telephony operator. The validation server in this specific embodiment may be a mobile services switching center (MSC) or a visitor location register (VLR) or a home location register (HLR).

In one alternative, the validation server is situated within the transactional terminal. In this case, the user's telephony operator communicates with the transactional terminal to send it all the information needed to validate the transaction.

In the context of this example, it is assumed that the user U1 carrying the mobile device DM1 wishes to make a purchase and pay for it by using the transactional TT4. Naturally, this system can be implemented in other cases, such as the validation of an access to a secured zone.

The advantages provided by the an example of the method include the following:

it is not necessary to give a new piece of equipment to the user who can use his mobile device. This approach is therefore economically very worthwhile.

the method works with any telephone whatsoever: it is not necessary to change one's mobile device for the system to work. The simple fact of having a mobile device available is sufficient.

the system is easy to use, making it rapidly accepted by users.

the system is reliable: to be able to act fraudulently, it is necessary on the one hand to steal the user's mobile device and, on the other hand, to determine his confidential code. Fraud is therefore highly improbable.

finally, telecommunications operators are always looking for ways to limit the fickleness of their subscribers (in other words, to create subscriber loyalty) and the fact of associating payment functions with a mobile device is of a nature to reduce fickleness and create subscriber loyalty.

2. Description of One Embodiment

Figure 2:
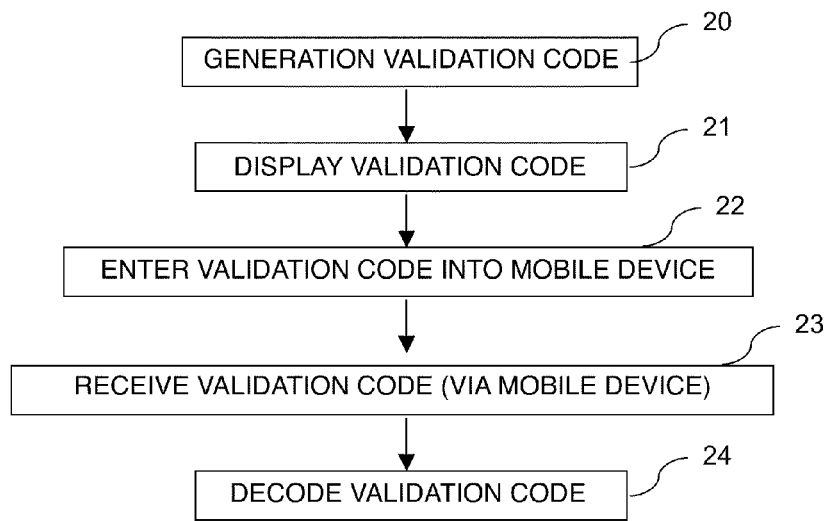
FIGS. 2 and 3 illustrate the main steps of a particular embodiment of the method.

Referring now to FIG. 2, we shall present the main steps of the method for validating a transaction according to one embodiment in which the transactional terminal is a payment terminal used to make purchases and the mobile device is a cell phone.

The method comprises a first step 20 for generating a validation code by means of the transactional terminal which displays the code during a display step 21.

For example, the display is done on the screen of the transactional terminal itself or on a screen connected to the transactional terminal such as a screen of a cash register in a store.

This validation code corresponding for example to a sequence of letters (for example AIYT) is generated by the transactional terminal, in particular from its own identifier.

In the example of FIG. 1, such an identifier is a digit but it can also be a number assigned for example according to the particular embodiment described here above.

The user involved in the transaction must then enter this validation code displayed by the transactional terminal into his own mobile device (for example his cell phone) at an entry step 22.

According to one particular embodiment of the disclosure, the user enters this code in the form of an SMS or MMS type validation message which he then transmits to a validation server, for example through a short number of the "8000" type.

This validation server receives this code at a reception step 23 and decodes it at a decoding step 24 in order to validate the transaction.

If the validation server is directly managed by the user's telephony operator, the validation message transmitted by the user through his mobile device is directly received by the validation server.

If the validation server is managed independently of the user's telephony operator, the operator transmits the validation message to the validation server along with information localizing the user's mobile device. The validation server is thus linked to the user's telephony operator.

Figure 3:
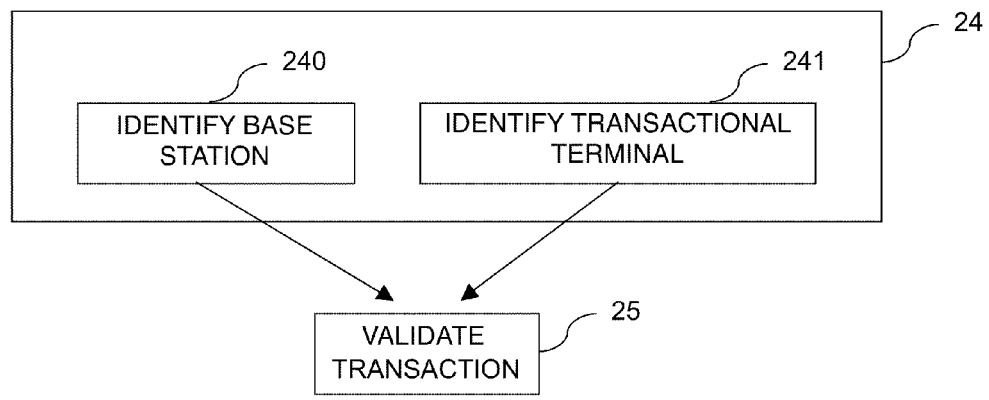

Referring now to FIG. 3, we present the main steps of the decoding of the validation code and the decision to validate the transaction.

At a first stage, in a step 240 for identifying a base station, the validation server can associate a base station with the user, for example SB1 referring to FIG. 1, with which the user is connected. Indeed, the validation message received from the user's mobile device enables the validation server to localize the user through the base station to which the mobile device is connected.

Similarly, from the identification of this base station, the validation server can identify the transactional terminals which are localized in the coverage zone of this base station and are therefore close to the user. Indeed, the validation server, whether it is directly managed by the user's telephony operator or independent but linked to the user's telephony operator, is capable of knowing each base station of the mobile telecommunications network and therefore, when the transactional terminals are mobile, the validation server can know those that are connected to each base station of the mobile telecommunications network.

Thus, the geographical position of the transactional terminal can be automatically inferred from the fact that it is taken over by a given base station (this assumes that the transactional terminal has a SIM card, which is very common). This is important because an implementation of this kind totally does away with any notion of geographical coordinates. The fact that cell phones are in the field of a base station which also covers a transactional terminal means that the cell phones are in the vicinity of the transactional terminal in question. This is enough for the validation server to identify the transactional terminal or terminals localized in the vicinity of the user as described here above.

Similarly, the validation server is able to know the transactional terminals connected to a wired network and therefore, among these terminals, the validation server is capable of knowing those that are in the coverage zone of the base station identified (see here below). To this end, it can be planned that the validation server will manage a list of transactional terminals connected to the wired network and localized in the coverage zones of the base stations.

Thus, the transactional terminals potentially used for the transaction to be validated are identified by the validation server from the localization of the user's mobile device.

At a second stage, the validation server can precisely identify the transactional terminal, using the validation code received.

Indeed, according to one particular variant of this embodiment, the validation code received by the validation server corresponds to a concatenation of two elements, respectively representing an identifier of the transactional terminal and the transaction.

For example, this four-letter code (AIYT) can be split up as follows:

a number N corresponds to an identifier of the transactional terminal implementing the transaction to be validated;

a number Q representing the opened transaction to be validated, for example a transaction number representing one of the transactions awaiting completion performed by the transactional terminal implementing the transaction to be validated. Q is typically a small integer, for example an integer whose value varies from 0 to 9 because there are rarely more than nine clients before a transactional terminal at a given point in time. Once a transaction having a given number Q has been validated, this value of Q is recycled by the transactional terminal for other transactions.

According to one particular aspect of the disclosure, the transactional terminals are identified by a unique identifier N corresponding for example to the result of a function $f$ used to associate a unique identifier with a transactional terminal as a function of its localization (x,y) (see here below for a method for assigning an identifier to a transactional terminal).

Thus, as illustrated in FIG. 1, several transactional terminals may have the same identifier if the telecommunications network is considered as a whole but a unique identifier if we consider a coverage zone of a base station.

With this number N extracted from the validation code received, and the preliminary identification of the base station, the validation server can therefore uniquely identify the transactional terminal involved in the transaction to be validated, during a step 241 for identifying the transactional terminal.

Then, the step 25 for validating the transaction consists in checking that the number Q of the transaction truly corresponds to a transaction opened (in progress) by the transactional terminal that has been preliminarily identified, and then in associating the sum of the transaction with the user and validating the transaction conventionally (for example after checking the balance in the user's account).

Indeed, according to an exemplary aspect of the disclosure, the validation server is capable of knowing all the transactions made by the transactional terminals localized in the telecommunications network and can thus ascertain that the transaction number Q is effectively a transaction that has been opened (in progress) by the preliminarily identified transactional terminal.

For example, the transactional terminals send the validation server (when it is directly managed by the user's telephony operator) information on the transactions made on each of them.

In another case, the transactional terminals transmit information on the transactions made on each of them to their telephony operator (or more specifically to the telephony operator of the tradesman that uses them). If this telephony operator is different from the user's telephony operator, the operators communicate with one another to enable the validation of the transaction.

According to one embodiment, it is planned that the transactional terminal will transmit this information to an operator chosen by the user. Thus, the information can be directly transmitted to the user's operator. To this end, the method according to one embodiment comprises a step for identifying a communications operator. For example, the transactional terminal offers the user a choice between various operators (for example Operator #1: number=1, Operator #2: number=2, . . . ). Then, the user enters the number corresponding to his operator into the transactional terminal, so that the transactional terminal and the tradesman know the validation server to which the information on the transactions must be transmitted.

If this verification that the number Q of the transaction truly corresponds to a transaction opened (in progress) by the preliminarily identified transactional terminal is positive, then the validation server has the following information available to validate the transaction:

- the transaction to be validated No. Q is being implemented on a transactional terminal TTx (verification possible by means of the decoded validation code);
- the mobile device DMy of the user is identified and localized;
- the base station STBz to which DMy is connected is identified and localized;
- the transactional terminal TTx is localized in the coverage zone of the base station STBz from the decoded validation code.

The validation server can therefore validate the transaction by subsequently performing for example the following operations:

- debiting the amount of the transaction No. Q from the user's account;
- crediting the account associated with the transactional terminal TTx;
- sending a validation of transaction to the transactional terminal TTx.

As a complement, upon reception of this validation from the validation server, the transactional terminal can send a ticket representing the transaction to the user and thus close the transaction.

In addition to the validation method as described here above, the present disclosure also relates to a validation system comprising one or more devices for implementing the method described here above.

For example, the validation system can include a computer program product downloadable from a communications network and/or recorded on a non-transitory computer-readable carrier and/or executable by a processor. The produce includes program code instructions to implement one or more steps of the method for validating a transaction as described herein.

3. Other Embodiments and Complementary Characteristics 3.1. Entering the Confidential Code According to one particular characteristic of the disclosure, an additional step for entering a confidential code into the transactional terminal is performed by the user. This entry operation is an additional safety measure used to ascertain that the user truly has this information available to him.

The confidential code entered by the user into the transactional terminal is then transmitted by the transactional terminal to the validation server or to the user's telephony operator which is itself linked to the validation server. In this case, the transactional terminal must know the telephony operator in question.

To this end, the method according to one embodiment comprises a step for identifying a communications operator as described here above. For example, the transactional terminal gives the user a choice between different operators (e.g. "Operator #1: number=1, Operator #: number=2, . . . ). The user then enters the number corresponding to his operator into the transactional terminal so that the transactional terminal, and the tradesman know the validation server to which the confidential code entered by the user must be transmitted.

It can be envisaged for example to make this entry of a confidential code obligatory only if the transaction exceeds a certain sum that can be parameterized according to the user, for example during a preliminary phase of registration with the validation server.

An additional measure of security can be obtained by locking the user's mobile device in a conventional way after a certain period of inactivity.

Another measure of security may consist in making the entry of a confidential code obligatory to permit the sending of the validation message (containing the validation code) to the validation server or again including a confidential code in the body of the validation message. Thus, if the user's mobile device is stolen by an ill-intentioned person, the latter will not be able to use the mobile device to validate a transaction if he or she does not know the confidential code to be inserted into the validation message.

3.2 Assigning an Identifier to a Transactional Terminal

According to one particular characteristic, the unique identifier attributed to each transactional terminal localized in a coverage zone of a base station is determined by taking account of the localization of the transactional term, i.e. its position (x,y).

We therefore consider a function $f(x,y)$ delivering a unique number to a transactional terminal as a function of its localization, such that: $f=a\times v+u$.

By construction, the function $f(x,y)$ delivers an integer ranging from 0 to n−1, n representing the number of different identifiers that can be assigned to the transactional terminals to be considered.

We also consider:

- two integers a and b, such that $b \geq a$, and $n=a\times b$;
- $w=E[x/a] \bmod 2$;
- $u=x \bmod a$;
- $v=(y+w\times E[b/2]) \bmod b$, with $E[.]$ the integer part.

The function $f(x,y)$ being periodic, the minimum distance d between two points having the same value of $f$, i.e. two transactional terminals localized at two different places, can be obtained by a shift of "b paces" or footsteps vertically (along y) or by a shift of "a paces" horizontally (along x) and "b/2 paces" vertically (along y).

For example, we can write:

$$d = \mathrm{Min}\left(b, \sqrt{a^2 + \frac{b^2}{4}}\right),$$

which can be optimized by a relationship a/b close to $$\frac{\sqrt{3}}{2}.$$

For example, if it is sought to assign four-digit numbers (for the ease of the final users) to the transactional terminals, then it would be appropriate to choose a=93 and b=107, giving n=9951 and a distance of 107 paces between two transactional terminals having the same identifier.

From this method, which assigns values to all the points of the infinite plane, it is easy to adapt a finite mapping. Indeed, since the construction is periodic, any starting point is appropriate and can be used to keep the distance of 107 paces between two transactional terminals with a same identifier.

3.3 Complementary Characteristics

In one particular embodiment, when the user is a subscriber of a foreign group (OE) having a roaming agreement with a national operator (ON), the implementing of the method is almost identical. Indeed, the presence of a foreign subscriber in the coverage zone of the base station of a national operator is a piece of information known to the national operator. Thus, the localizing of the user's mobile device as well as the identification of the transactional terminal can be done as described here above. Only the steps for the validation proper of the transaction, regarding for example checks on the balance in the user's account, may require for example exchanges with a foreign server in charge of managing the user's account.

An aspect of the disclosure thus provides a technique for validating a transaction associated with a user, which technique is swift and reliable in the case of a system used to reference a large number of users to enable the user to perform an action such as a payment.

An aspect of the disclosure provides a technique of this kind that is also ergonomic for the user.

An aspect of the disclosure provides a technique of this kind that costs little and is easy to implement.

Although the present disclosure has been described with reference to one or more examples, workers skilled in the art will recognize that changes may be made in form and detail without departing from the scope of the disclosure and/or the appended claims.

What is claimed is:

1. A method for validating a transaction made on a transactional terminal, said transaction being associated with a user, wherein the method comprises:
   receiving a validation message from a mobile device of a user, containing a validation code for the transaction, which comprises at least one piece of information representing an identifier of the transactional terminal and was preliminarily displayed on the transactional terminal entered by the user of the mobile device and transmitted with the validation message by the mobile device to an entity of a telecommunications network to which said mobile device and said transactional terminal are connected;
   identifying a base station of the telecommunications network to which the mobile device of the user is connected;
   decoding the validation code for the transaction from the validation message to deliver the at least one piece of information representing the identifier of the transactional terminal; and
   validating the transaction based on whether the identified transactional terminal is in a zone of coverage of the identified base station to which the mobile device of the user is connected.

2. The method for validating according to claim 1, wherein said validation message is of the SMS or MMS type.

3. The method for validating according to claim 1, wherein said decoding step also delivers a piece of information representing said transaction.

4. The method for validating according to claim 1, wherein said identifier of the transactional terminal corresponds to the result of a function $f(x,y)$ enabling a unique identifier to be associated with a transactional terminal as a function of a location (x,y) of the transaction terminal.

5. The method for validating according to claim 4, wherein said function comprises:
   $f(x,y)=a \times v+u$, with:
   a and b being two integers such that $b \geq a$, and $n = a \times b$, where n represents the number of different identifiers to be allotted to the transactional terminal;
   $w = E[x/a] \bmod 2$;
   $u = x \bmod a$;
   $v = (y+w \times E[b/2]) \bmod b$, with E[.] being the integer part; and $$d = \text{Min}\left(b, \sqrt{a^2 + \frac{b^2}{4}}\right)$$

the minimal distance between two distinct transactional terminals.

6. The method for validating according to claim 1, wherein the method also comprises receiving a confidential code, preliminarily entered by said user into said transactional terminal and transmitted by said transactional terminal concomitantly with the transmission of said validation code by said mobile device of said user.

7. The method for validating according to claim 1, wherein said validation message includes a confidential code.

8. The method for validating according to claim 1, wherein the method comprises selecting a telephone operator with which the mobile device of said user is registered.

9. The method for validating according to claim 1, wherein the transactional terminal comprises a mobile payment terminal connected to said telecommunications network.

10. The method for validating according to claim 1, wherein said transaction terminal is connected to said base station.

11. The method for validating according to claim 1, wherein the method comprises transmitting said validation code by said entity of the telecommunications network to said transactional terminal, and wherein decoding said validation code is implemented within said transactional terminal.

12. A system for validating a transaction made on a transactional terminal, said transaction being associated with a user, wherein the system comprises:
    means for receiving a validation message from a mobile device of a user containing a validation code for the transaction, which comprises at least one piece of information representing an identifier of the transactional terminal and was preliminarily displayed on the transactional terminal, entered by the user of the mobile device and transmitted with the validation message by the mobile device to an entity of a telecommunications network to which said mobile device and said transactional terminal are connected;
    means for identifying a base station of the telecommunications network to which the mobile device of the user is connected;
    means for decoding the validation code for the transaction from the validation message to deliver the at least one piece of information representing the identifier of the transactional terminal; and
    means for validating the transaction based on whether the identified transactional terminal is in a zone of coverage of the identified base station to which the mobile device of the user is connected.

13. A transactional terminal comprising:
    means for generating a validation code associated with a transaction made on the transaction terminal and a user based on at least one piece of information representing an identifier of said transactional terminal; and
    means for displaying said validation code generated on a display device of said transactional terminal.

14. The transactional terminal of claim 13, and further comprising:
    means for receiving the validation code from an entity of a telecommunications network to which said transactional terminal and a mobile device associated with the user are connected, subsequently to displaying the validation code, and for decoding said validation code.

15. A computer program product recorded on a non-transitory computer-readable carrier, wherein the product comprises program code instructions to implement a method of validating a transaction when executed by a processor, the method comprising:

receiving a validation message from a mobile device of a user, containing a validation code for the transaction, which comprises at least one piece of information representing an identifier of the transactional terminal and was preliminarily displayed on the transactional terminal, entered by the user of the mobile device and transmitted with the validation message by the mobile device to an entity of a telecommunications network to which said mobile device and said transactional terminal are connected;

identifying a base station of the telecommunications network to which the mobile device of the user is connected;

decoding the validation code for the transaction from the validation message to deliver the at least one piece of information representing the identifier of the transactional terminal; and validating the transaction based on whether the identified transactional terminal is in a zone of coverage of the identified base station to which the mobile device of the user is connected.

16. A method for validating a transaction made on a transactional terminal, said transaction being associated with a user, wherein the method comprises:

displaying a validation code on the transactional terminal;

entering the displayed validation code into a mobile device that is associated with the user;

transmitting a validation message containing the validation code by the mobile device to an entity of a telecommunications network to which said mobile device and said transactional terminal are connected; and decoding the validation code from the received validation message.

* * * * *